United States Patent [19]

Yumiyama et al.

[11] Patent Number: 5,587,619
[45] Date of Patent: Dec. 24, 1996

[54] ROTARY ARMATURE AND METHOD OF FORMING ARMATURE COIL

[75] Inventors: Shigeru Yumiyama, Katsuta; Ko Onodera, Hitachioota; Yoshimi Mori, Mito, all of Japan

[73] Assignee: Hitachi, Ltd., Japan

[21] Appl. No.: 168,172

[22] Filed: Dec. 17, 1993

[30] Foreign Application Priority Data

Dec. 21, 1992 [JP] Japan .................... 4-339954

[51] Int. Cl.⁶ .............. H02K 1/04; H02K 3/04; H02K 17/00
[52] U.S. Cl. ............... 310/201; 310/208; 310/43
[58] Field of Search ............... 310/42, 43, 201, 310/208

[56] References Cited

U.S. PATENT DOCUMENTS

| | | | |
|---|---|---|---|
| 4,602,180 | 7/1986 | Olson | 310/215 |
| 4,818,909 | 4/1989 | Balke | 310/208 |
| 4,876,473 | 10/1989 | Tanaka et al. | 310/216 |
| 5,045,742 | 9/1991 | Armstrong et al. | 310/254 |
| 5,266,858 | 11/1993 | Ohmi et al. | 310/208 |

FOREIGN PATENT DOCUMENTS

| | | | |
|---|---|---|---|
| 558486 | 1/1936 | Germany | H02K 3/30 |
| 3803752A1 | 8/1988 | Germany | H02K 3/12 |
| 590753 | 7/1947 | United Kingdom | H02K 3/34 |

Primary Examiner—Steven L. Stephan
Assistant Examiner—Michael Wallace, Jr.
Attorney, Agent, or Firm—Evenson, McKeown, Edwards & Lenahan P.L.L.C.

[57] ABSTRACT

A central conductor portion of a coil is formed with a potbelly-shaped cross-sectional form and a flat-shaped face of an insulated coating film of the potbelly-shaped cross-sectional form coil is made thinner than an arc-shaped face of the insulated coating film of the potbelly-shaped cross-sectional form coil. An insulated coating wire having a circular-shaped cross-sectional form is formed to a coil having a potbelly-shaped cross-sectional form by rolling process at a normal temperature. A dead space in a slot is lessened and the magnetic resistance of a magnetic core is decreased, thereby a small size and a high output electric motor can be obtained. A method of forming a rotary armature coil having a high space factor in the slot can be attained.

7 Claims, 2 Drawing Sheets

ROTARY ARMATURE AND METHOD OF FORMING ARMATURE COIL

BACKGROUND OF THE INVENTION

The present invention relates to a rotary armature of an electric motor and a method for forming an armature coil and, more particularly to a rotary armature on which a multi-coil structure form is performed and a method for forming an armature coil suitable for use in an electric starter motor for an automobile.

As a coil which is wound with a multi-coil structure form on a slot of a rotary armature of an electric motor, a coil having a circular-shaped cross-sectional form is disclosed, for example, in Japanese patent laid-open No. 121,452/1988, Japanese patent laid-open No. 265,534/1988 and Japanese patent laid-open No. 305,737/1988, further a coil having a flat quadrilateral-shaped cross-sectional form has been known, and also an insulated coating wire having a flat quadrilateral-shaped cross-sectional form by forming an insulated coating wire having a circular-shaped cross-sectional form through a pressing process under pressure is disclosed, for example, in Japanese patent laid-open No. 240,832/1986.

In the above stated prior arts, so as to improve the space factor during the coil is wound with the multi-coil structure form in the slot, a central conductor portion (a slot insertion conductor portion) is performed from the insulated coating wire having the circular-shaped cross-sectional form to the insulated coating wire having the flat quadrilateral-shaped cross-sectional form. Accordingly, it contrives to lessen a dead space at the inner peripheral wall surface of the slot or the conductor.

However, there takes no consideration about a problem the space factor is suffered to lessen enough the thickness of the insulated coating film of the coil.

Namely, after by forming the central conductor portion with a predetermined cross-sectional form, in a case the central conductor portion is coated according to the insulated coating film, since the thickness of the insulated coating film is formed uniformly at a whole periphery, however it is impossible to lessen the dead space at the inner peripheral wall surface of the slot or the conductor.

Further, in a case that the coil has the flat quadrilateral-shaped cross-sectional form, in particularly, in a case the armature core in which the insulated coating wire is inserted into the slot from an axial direction, so as not to peel an insulated coating member at an inlet portion or a midway portion of the slot it is necessary to insulate the magnetic core in accordance the employment of an insulating sheet (thickness of the insulating sheet 0.3–0.5 mm degree, in ordinary).

Accordingly, even in a case that the insulating sheet is inserted, it is unavoidable to lessen the space factor enough the thickness of a pair of insulated coating films having the flat quadrilateral-shaped cross-sectional form being opposite each other.

Besides, in a case that the coil in which the central conductor portion having the circular-shaped cross-sectional form is coated by the insulated coating film and this coil is formed to have the flat quadrilateral-shaped cross-sectional form according to the pressing process under pressure merely from an upper direction and a lower direction.

In the processed coil formed on the imaginary at the flat quadrilateral-shaped cross-sectional form, however the central conductor portion is formed substantially with a mul-tangular-shaped form. Accordingly, the thickness of the insulated coating film does not change hardly, in this case the space factor of the slot does not increase.

This space factor of the slot gives a large affect on the electric motor in which a small size and a high output of the electric motor are required, as a result it is advisable to improve the space factor of the slot.

SUMMARY OF THE INVENTION

An object of the present invention is to provide a rotary armature wherein a high space factor of a coil structure can be obtained simply and easily.

Another object of the present invention to provide a method of forming a rotary armature coil wherein a high space factor of a slot structure can be obtained easily.

In accordance with the present invention, a rotary armature comprises a shaft supported rotatable both ends thereof, a magnetic core fixed by the shaft and forming a plurality of slots at an outer periphery, and a flat type coil insulated the magnetic core by an insulating material, the flat type coil is a multi-coil structure form in one slot and coated by an insulated coating film.

The present invention is attained by performing in the flat type coil, a pair of the insulated coating film being opposed each other are made thinner than another pair of the insulated coating film being opposed each other.

Another of the present invention is attained by making thinner a pair of flat-shaped faces of the insulated coating film of the potbelly-shaped cross-sectional form flat type coil thinner than another pair of the arc-shaped faces of the insulated coating film of the potbelly-shaped cross-sectional form flat type coil.

In the potbelly-shaped cross-sectional form coil, since by fitting the cross-sectional form under the multi-coil structure state to the form of the slot, the coil is inserted into the slot of the magnetic core, a dead space can be lessened because that the thickness of the flat-shaped face of the insulated coating film is made thinner than the thickness of the arc-shaped face of the insulated coating film.

So as to contact to the arc-shaped face of the insulated coating film of the coil then the insulation structure can be ensured at the potbelly-shaped cross-sectional form coil. The width at the lateral direction of the central conductor portion can be made long toward a side of the flat-shaped face of the insulated coating film, thereby the conductivity of the coil can be increased.

Further, by employing the rollers the insulated coating wire is rolling-processed and by forming the insulated coating film having the uniform thickness, the thickness of two faces of the insulated coating film being opposed each other are made thinner than the thickness of two faces of the insulated coating film being opposed each other.

According to the present invention, the dead space in the slot can be made small and the magnetic resistance of the magnetic core can be decreased, thereby an electric motor having a small size and a high output can be obtained.

According to the present invention, a method of forming a rotary armature coil having a high space factor of the slot can be obtained easily.

DESCRIPTION OF THE INVENTION

Figure 1:
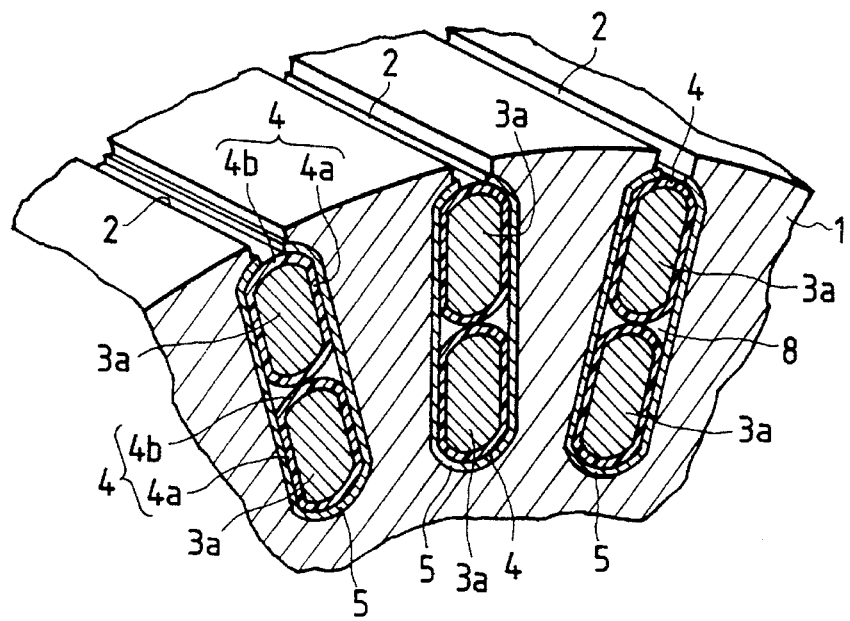
FIG. 1 is a partially cross-sectional view showing a slot surrounding portion of a rotary armature of a first embodiment according to the present invention.
Figure 2:
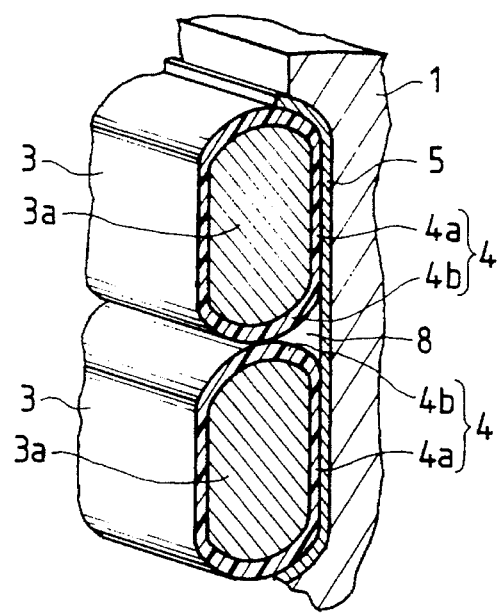
FIG. 2 is a partially enlarged view of FIG. 1.
Figure 3:
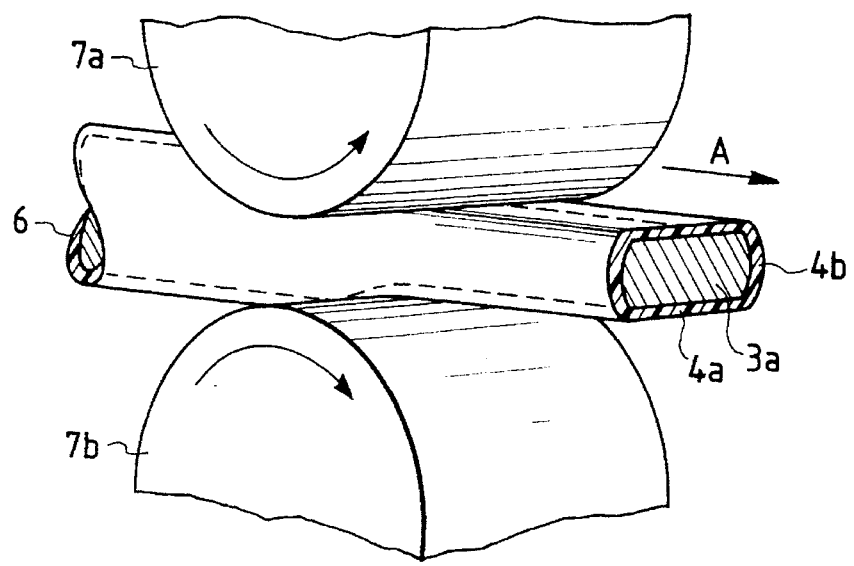
FIG. 3 is an explanatory rolling process view showing a coil having a potbelly-shaped cross-sectional form according to the present invention.

Hereinafter, a first embodiment according to the present invention will be explained referring to FIG. 1, FIG. 2 and FIG. 3.

First of all, a rotary armature structure of the first embodiment according to the present invention will be explained referring to FIG. 1 and FIG. 2.

At an outer periphery of a magnetic core 1 which is formed by laminating a thin steel plate, a plurality of equally-divided slots 2 are formed toward a radial direction. At portions of a plurality of slots 2, a flat type coil 3 having a potbelly-shaped cross-sectional form is arranged with a multi-coil structure form by an insulating sheet 5. This insulating sheet 5 has ordinary a thickness of 0.3–0.5 mm.

This magnetic core 1 is fixed through a shaft (not shown in figure) and this shaft is supported at both ends thereof.

A central conductor portion 3a of the potbelly-shaped cross-sectional form coil 3 is coated by a polyester system insulated coating film 4 or an enamel system insulated coating film 4 etc.. The insulated coating film 4 comprises a pair of flat-shaped face insulated coating films 4a being opposed each other and a pair of arc-shaped face insulated coating films 4b being opposed each other.

The flat-shaped face insulated coating film 4a of the potbelly-shaped cross-sectional form coil 3 has a thinner film thickness of about 30 μm than the film thickness of the arc-shaped face insulated coating film 4b (about 48 μm).

In the above stated slot 2, the potbelly-shaped cross-sectional form coil 3 contacts each other to the arc-shaped face insulated coating films 4b, two outer surfaces of the opposed flat-shaped face insulated coating films 4a contact to the insulating sheet 5. Namely, the insulating sheet 5 is sandwiched by the magnetic core 1 and the flat-shaped face insulated coating films 4a.

A dead space 8 is formed between an inner wall surface of the insulating sheet 5 and two outer surfaces of the opposed arc-shaped face insulated coating films 4b.

Next, a manufacturing method of the potbelly-shaped cross-sectional form coil 3 will be explained referring to FIG. 3.

An insulated coating wire 6 having a circular-shaped cross-sectional form comprises the insulated coating film 4 (4a, 4b) having an uniform film thickness. As shown in FIG. 3, this insulated coating wire 6 is pressed under pressure at a normal temperature from an upper direction and a lower direction using two rollers 7a and 7b.

For example, when the insulted coating wire 6 having a diameter of 2.4 mm is pulled toward A direction and is rolling-processed to form flatly until a diameter of 1.7 mm in the height direction, the insulated coating films 4a at the upper portion and the lower portion are suffered to the rolling-processing. As a result, the flat-shaped face insulated coating film 4a of the insulted coating wire 6 is made thinner than the arc-shaped face insulated coating film 4b of the insulted coating wire 6.

However, one opposite s of the insulated coating film 4 of the insulted coating wire 6 not to be suffered to the rolling process, namely the arc-shaped face insulated coating films 4b remain as the insulated coating film maintaining the film thickness of the circular-shaped cross-sectional form insulated coating wire 6.

As a result, the potbelly-shaped cross-sectional form coil 3 is formed in a form in which the film thickness of the flat-shaped face insulated coating film 4a is thinner than the film thickness of the arc-shaped face insulated coating film 4b.

For example, in a case of the insulated coating wire 6 having the circular-shaped cross-sectional form comprised of the enamel system insulted coating films 4a and 4b having the film thickness of about 48 μm, the potbelly-shaped cross-sectional form coil 3 is formed in a form in which the arc-shaped face insulated coating film 4b has the film thickness of about 48 μm and the flat-shaped face insulated coating film 4a has the film thickness of about 30 μm, respectively.

Accordingly, the flat-shaped face insulated coating film 4a is formed with an extremely thinness, however there occurs no problem in a practical use about the insulation structure, because the compensation by the existence of the insulating sheet 5 is performed.

According to the above first embodiments, the following effects can be obtained.

Since the coil 3 is formed at the potbelly-shaped cross-sectional form and since the cross-sectional form under the multi-coil structure state is fitted to the form of the slot 2 and after the potbelly-shaped cross-sectional form coil 3 is inserted into the slot 2 of the magnetic core 1, the dead space 8 can be made small and the magnetic resistance of the magnetic core 1 can be decreased. Accordingly, the electric motor can be made the small size and further the output of the electric motor can be improved.

Since the film thickness of the flat-shaped face insulated coating film 4a is made thinner than the film thickness of the arc-shaped face insulated coating film 4b in the slot 2, the potbelly-shaped cross-sectional form coil 3 is contacted to each other at the arc-shaped face insulated coating film 4b, thereby the insulation structure can be ensured at the potbelly-shaped cross-sectional form coil 3.

The width at the lateral direction of the central conductor portion 3a can be made long toward a side of the flat-shaped face, the conductivity of the potbelly-shaped cross-sectional form coil 3 can be increased. Accordingly, the space factor of the slot 2 can be increased.

Since the circular-shaped cross-sectional form insulated coating wire 6 is formed to the potbelly-shaped cross-sectional form coil 3 by the simple normal temperature rolling process, the potbelly-shaped cross-sectional form coil 3 can be manufactured at a low cost.

Figure 4:
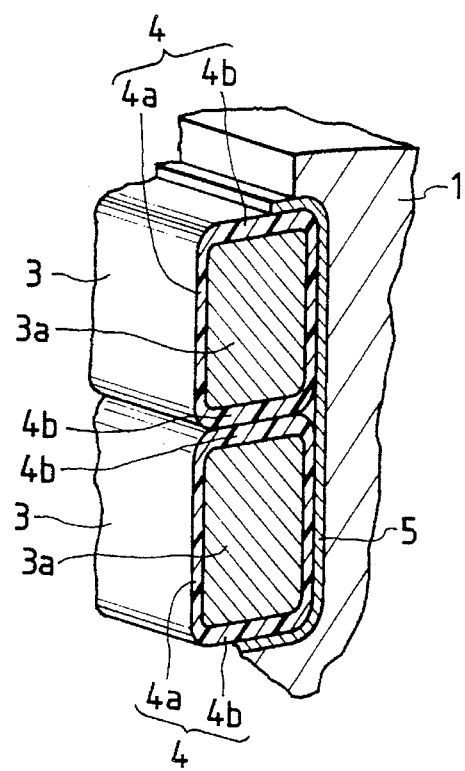
FIG. 4 is a partially and enlarged cross-sectional view showing a slot surrounding portion of a rotary armature of a second embodiment according to the present invention.

FIG. 4 is a second embodiment according to the present invention.

This second embodiment is that by a rolling-processing process of the insulated coating wire having the quadrilateral-shaped cross-sectional form, a nonuniform shape coil 3 having the flat quadrilateral-shaped cross-sectional form insulated coating film 4 is formed and this second embodiment has the similar effects shown in the first embodiment.

We claim:

1. A rotary armature, comprising a shaft supported rotatably at both ends thereof;

a magnetic core fixed by said shaft and forming a plurality of slots at an outer periphery thereof; and a flat type coil insulated from said magnetic core by an insulating material, said flat type coil being a multi-coil structure in one slot and coated by an insulated coating film; wherein said flat type coil comprises a first flat type coil and a second flat type coil, said first flat type coil having a first pair of said insulated coating films oppositely arranged to each other in a rotational direction of the armature and being made thinner than a second pair of insulated coating films which are oppositely arranged to each other in a radial direction of the armature, said second flat type coil having a third pair of said insulated coating films being oppositely arranged to each other in the rotational direction, and being made thinner than a fourth pair of insulated coating films oppositely arranged to each other in the radial direction, one of said second pair of said insulated coating films in the radial direction of said first flat type coil being opposed to one of said fourth pair of said insulated coating films in the radial direction of said second flat type coil, one of said second pair of said insulated coating films in the radial direction of said first flat type coil contacting one of said fourth pair of said insulated coating films in the radial direction of said second flat type coil, one of said second pair of said insulated coating films in the radial direction of said first flat type coil contacting an insulating sheet, sandwiched between said magnetic core and said second pair of said insulating coating films in the radial direction of said first flat type coil, and one of said fourth pair of said insulated coating films in the radial direction of said second flat type coil contacting an insulating sheet sandwiched between said magnetic core and said fourth pair of said insulating coating films in the radial direction of said second flat type coil.

2. A rotary armature according to claim 1, wherein each of said first flat type coil and said second flat type coil has a potbelly-shaped cross-sectional form, and two flat-shaped faces of said insulated coating film of said potbelly-shaped cross-sectional form first flat type coil are arranged in the rotational direction and are thinner than two opposed arc-shaped faces of said insulated coating film of said potbelly-shaped cross-sectional form first flat type coil arranged in the radial direction, two flat-shaped faces of said insulated coating film of said potbelly-shaped cross-sectional form second flat type coil are arranged in the rotational direction and are made thinner than two opposed arc-shaped faces of said insulated coating film of said potbelly-shaped cross-sectional form second flat type coil which are arranged in the radial direction, one of said two arc-shaped faces of said insulating coating film of said potbelly-shaped cross-sectional form first flat type col in the radial direction is opposed to one of said two-arc-shaped faces of said insulating coating film of said potbelly-shaped cross-sectional form second flat type coil in the radial direction, one of said two arc-shaped faces of said insulated coating films in the radial direction of said potbelly-shaped cross-sectional form first flat type coil contacting one of said two arc-shaped faces of said insulated coating films in the radial direction of said potbelly-shaped cross-sectional form second flat type coil, one of said two flat-shaped faces of said insulated coating films in the radial direction of said potbelly-shaped cross-sectional form first flat type coil contacting an insulating sheet, sandwiched between said magnetic core and said two flat-shaped faces of said insulating coating films in the radial direction of said potbelly-shaped cross-sectional form first flat type coil, and one of said two flat-shaped faces of said insulated coating films in the radial direction of said cross-sectional form second flat type coil contacting an insulating sheet sandwiched between said magnetic core and said two flat-shaped faces of said insulating coating films in the radial direction of said potbelly-shaped cross-sectional form second flat type coil.

3. A rotary armature according to claim 2, wherein said potbelly-shaped cross-sectional form flat type coil is one of a rolled insulated coating wire having a quadrilateral-shaped cross-sectional form and a rolled insulated coating wire having a circular-shaped cross-sectional form.

4. A rotary armature according to claim 1, characterized in that said flat type coil is inserted into a slot of the armature core of an electric starter motor.

5. A rotary armature according to claim 2, wherein said flat type coil is inserted into a slot of the armature core of an electric starter motor.

6. A rotary armature according to claim 1, wherein said one of said another pair of said insulated coating films in the radial direction of said first flat type coil directly contacts said one of said another pair of said insulated coating films in the radial direction of said second flat type coil of each other.

7. A rotary armature according to claim 1, wherein said one pair of said insulated coating films toward in the rotation direction of said first flat type coil contacts an insulating sheet, and said insulating sheet is sandwiched by said magnetic core and said one pair of said insulated coating, films, and said one pair of said insulated coating films toward in the rotation direction of said second flat type coil contacts said insulating sheet, and said insulating sheet is sandwiched by said magnetic core and said one pair of said insulated coating films.

\* \* \* \* \*